(12) United States Patent
Kweon et al.

(10) Patent No.: US 9,515,983 B2
(45) Date of Patent: Dec. 6, 2016

(54) APPARATUS AND METHOD FOR MANAGING MOBILITY OF TERMINAL IN WIRELESS COMMUNICATION SYSTEM

(71) Applicant: Samsung Electronics Co., Ltd, Gyeonggi-do (KR)

(72) Inventors: Ki-Suk Kweon, Gyeonggi-do (KR); Jung-Shin Park, Seoul (KR); Yeong-Moon Son, Yongin-si (KR); Antony Franklin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 11 days.

(21) Appl. No.: 14/102,333

(22) Filed: Dec. 10, 2013

(65) Prior Publication Data

US 2014/0161062 A1    Jun. 12, 2014

(30) Foreign Application Priority Data

Dec. 10, 2012    (KR) .......................... 10-2012-0142848

(51) Int. Cl.
*H04W 4/00* (2009.01)
*H04L 29/12* (2006.01)
*H04W 8/08* (2009.01)
*H04W 8/06* (2009.01)

(52) U.S. Cl.
CPC ............ *H04L 61/2053* (2013.01); *H04W 8/06* (2013.01); *H04W 8/08* (2013.01); *H04L 61/2007* (2013.01)

(58) Field of Classification Search
USPC .......................... 370/328, 329, 331, 338, 401
See application file for complete search history.

(56) References Cited

U.S. PATENT DOCUMENTS

| | | | |
|---|---|---|---|
| 5,933,114 A * | 8/1999 | Eizenhofer et al. | 342/457 |
| 6,175,735 B1 * | 1/2001 | Meyer | 455/440 |
| 6,381,289 B1 * | 4/2002 | Dutta | 375/335 |
| 2005/0101321 A1 | 5/2005 | Ikeda et al. | |
| 2005/0130660 A1 | 6/2005 | Park et al. | |
| 2009/0168722 A1 * | 7/2009 | Saifullah et al. | 370/331 |
| 2011/0294508 A1 | 12/2011 | Min et al. | |
| 2012/0157105 A1 * | 6/2012 | Grob-Lipski | 455/437 |
| 2012/0165023 A1 * | 6/2012 | Park et al. | 455/438 |

(Continued)

FOREIGN PATENT DOCUMENTS

KR    10-2010-0037262 A    4/2010

OTHER PUBLICATIONS

International Search Report dated Mar. 27, 2014 in connection with International Patent Application No. PCT/KR2013/011394, 4 pages.
Written Opinion of International Searching Authority dated Mar. 27, 2014 in connection with International Patent Application No. PCT/KR2013/011394, 5 pages.

*Primary Examiner* — Ricky Ngo
*Assistant Examiner* — Christine Ng

(57) ABSTRACT

An apparatus performs a method for managing mobility of a terminal by a Base Station (BS) in a wireless communication system. The method includes receiving information on whether a time for which a terminal had been located at a cell managed by a first BS before the terminal has moved to a cell managed by the BS is equal to or longer than a predetermined threshold. The method also includes controlling data transmission/reception of the terminal by using one of an address allocated to the terminal by the BS or an address allocated to the terminal by a home server according to whether the time for which the terminal had been located at the cell managed by the first BS is equal to or longer than the predetermined threshold.

28 Claims, 6 Drawing Sheets

(56) References Cited

U.S. PATENT DOCUMENTS

| | | |
|---|---|---|
| 2012/0182936 A1 | 7/2012 | Haddad et al. |
| 2012/0188983 A1 | 7/2012 | Mihaly et al. |
| 2012/0263114 A1 | 10/2012 | Hamano et al. |
| 2013/0115949 A1* | 5/2013 | Centonza et al. ............ 455/436 |
| 2013/0165120 A1* | 6/2013 | Nylander et al. ............. 455/436 |
| 2014/0087739 A1* | 3/2014 | Weaver ......................... 455/441 |

* cited by examiner

APPARATUS AND METHOD FOR MANAGING MOBILITY OF TERMINAL IN WIRELESS COMMUNICATION SYSTEM

CROSS-REFERENCE TO RELATED APPLICATION(S) AND CLAIM OF PRIORITY

The present application is related to and claims priority under 35 U.S.C. §119(a) to Korean Application Serial No. 10-2012-0142848, which was filed in the Korean Intellectual Property Office on Dec. 10, 2012, the entire content of which is hereby incorporated by reference.

TECHNICAL FIELD

The present disclosure relates to a method and an apparatus for managing mobility of a terminal in a communication system, and more particularly, to an apparatus and a method for efficiently managing mobility of a terminal.

BACKGROUND

Since a terminal has mobility in a mobile communication network, the network may grasp a position of the terminal and transmit seamless data received from an external network to the terminal. Managing a position of the terminal is referred to as mobility management of the terminal, and a mobility management technology in a conventional mobile communication network adopts a centralized type based on a hierarchical network structure. In the centralized type, a mobility agent that manages mobility is located at a core network. For example, the mobility agent corresponds to a PDN GateWay (P-GW) in 3rd Generation Partnership Project (3GPP) System Architecture Evolution (SAE), and a Gateway GPRS Support Node (GGSN) in Universal Mobile Telecommunication System (UMTS) network.

Such a terminal mobility management in the centralized type has problems, such as inefficiency of a routing route, an error of a centralized type agent (single point of failure), and traffic centralization of a core network.

SUMMARY

To address the above-discussed deficiencies, it is a primary object to provide a method and an apparatus for efficiently managing mobility of a terminal in a communication system.

One embodiment of the present disclosure provides an apparatus and a method for managing mobility of a terminal in which the mobility management of the terminal may be performed in different ways according to a movement speed of the terminal.

In accordance with an aspect of the present disclosure, a method of managing mobility of a terminal by a Base Station (BS) in a wireless communication system is provided. The method includes: receiving information on whether a time for which a terminal had been located at a cell managed by a first BS before the terminal has moved to a cell managed by the BS is equal to or longer than a predetermined threshold; and controlling data transmission/reception of the terminal by using one of an address allocated to the terminal by the BS or an address allocated to the terminal by a home server according to whether the time for which the terminal had been located at the cell managed by the first BS is equal to or longer than the predetermined threshold.

In accordance with another aspect of the present disclosure, a method of managing mobility of a terminal in a wireless communication system is provided. The method includes: determining whether a time for which a terminal has been located at a cell managed by a first BS is equal to or longer than a predetermined threshold; and if the terminal moves to a cell managed by a second BS, transmitting one of information on an address allocated to the terminal by the second BS and information on an address allocated to the terminal by a home server to the first BS according to whether the time for which the terminal had been located at the cell managed by the first BS is equal to or longer than the predetermined threshold.

In accordance with another aspect of the present disclosure, a method of managing mobility of a terminal by a home server in a wireless communication system is provided. The method includes: receiving information on whether a time for which a terminal, which is located at a cell managed by a first BS, had been located at a cell managed by a second BS before the terminal has moved to the cell managed by the first BS is equal to or longer than a predetermined threshold; and controlling data transmission/reception of the terminal by using an address allocated to the terminal according to whether the time for which the terminal had been located at the cell managed by the second BS is shorter than the predetermined threshold.

In accordance with another aspect of the present disclosure, a BS managing mobility of a terminal in a wireless communication system is provided. The BS includes: a transmitter that transmits data to a terminal or a home server; a receiver that receives data from the terminal or the home server; and a controller that receives information on whether a time for which the terminal had been located at a cell managed by a first BS before the terminal has moved to a cell managed by the BS is equal to or longer than a predetermined threshold and controls data transmission/reception of the terminal by using one of an address allocated to the terminal by the BS and an address allocated to the terminal by the home server according to whether the time for which the terminal had been located at the cell managed by the first BS is equal to or longer than the predetermined threshold.

In accordance with another aspect of the present disclosure, a terminal for managing mobility in a wireless communication system is provided. The terminal apparatus includes: a transmitter that transmits data to a first BS or a second BS; a receiver that receives data from the first BS or the second BS; and a controller that determines whether a time for which a terminal has been located at a cell managed by the first BS is equal to or longer than a predetermined threshold, and, if the terminal moves to a cell managed by the second BS, transmits one of information on an address allocated to the terminal by the second BS and information on an address allocated to the terminal by a home server to the first BS according to whether the time for which the terminal had been located at the cell managed by the first BS is equal to or longer than the predetermined threshold.

In accordance with another aspect of the present disclosure, a home server managing mobility of a terminal in a wireless communication system is provided. The home server includes: a transmitter that transmits data to a first BS or a second BS; a receiver that receives data from the first BS or the second BS; and a controller that receives information on whether a time for which a terminal, which is located at a cell managed by the first BS, had been located at a cell managed by the second BS before the terminal has moved to the cell managed by the first BS is equal to or longer than a predetermined threshold and controls data transmission/reception of the terminal by using an address allocated to the terminal according to whether the time for which the terminal had been located at the cell managed by the second BS is shorter than the predetermined threshold.

According to an embodiment of the present disclosure, it is possible to perform a binding update by using an LHoA allocated to a terminal by a Base Station (BS) or a CHoA allocated to the terminal by a home server based on a movement speed of the terminal and thus efficiently use a routing route. Accordingly, the risk, such as breakdown or error, can be spread and a frequent binding update can be prevented even though the terminal is frequently handed off. In one embodiment, it is possible to reduce power consumption of the terminal, reduce congestion of the network, and also reduce overheads of the BS and the home server.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or method. Hereinafter, various embodiments of the present disclosure will be described with reference to the accompanying drawings. In the following description of the present disclosure, a detailed description of known functions and configurations incorporated herein will be omitted when it may make the subject matter of the present disclosure rather unclear.

Figure 1:
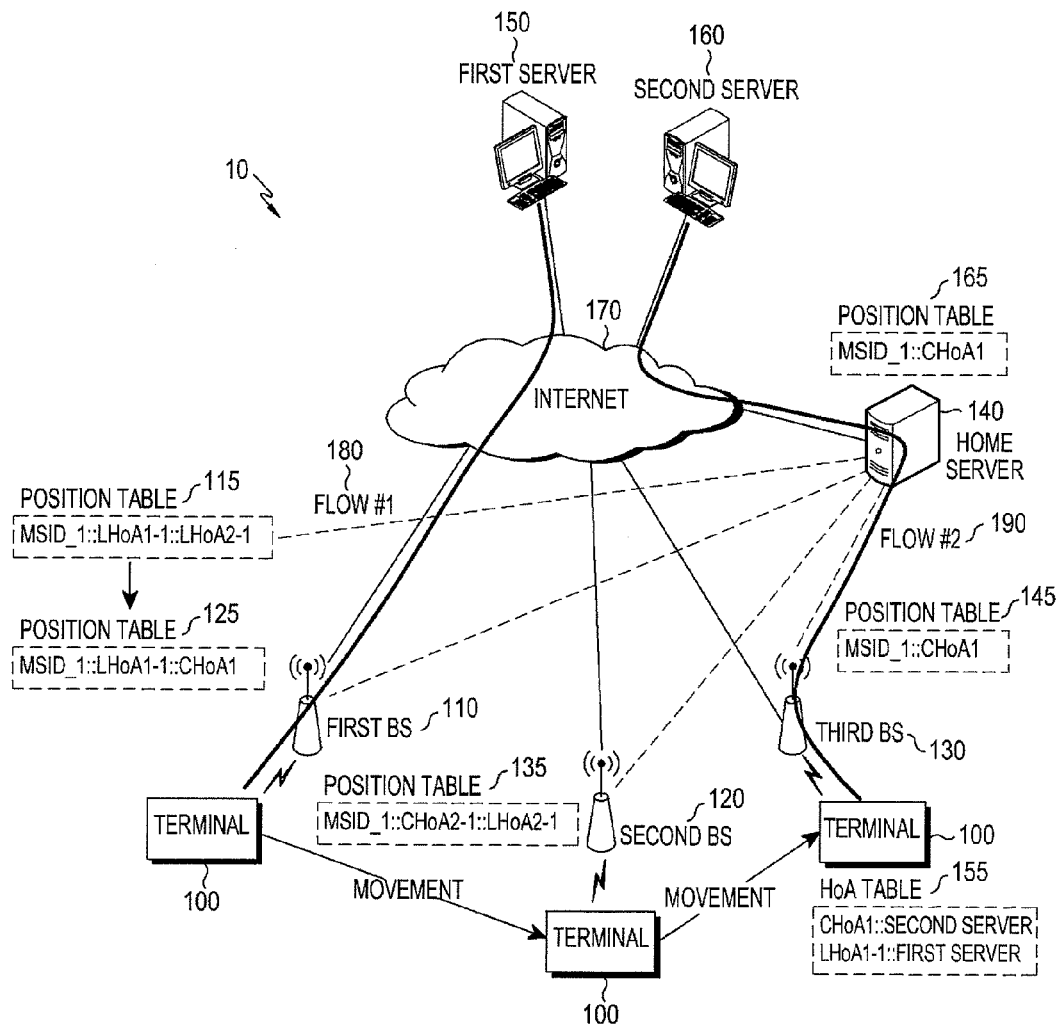
FIG. 1 illustrates a configuration of a communication system according to an embodiment of the present disclosure.

FIG. 1 illustrates a configuration of a communication system 10 according to an embodiment of the present disclosure.

Referring to FIG. 1, the communication system 10 includes Base Stations (BSs) 110, 120, and 130, a terminal 100, and a home server 160, and may further include one or more servers 150 and 160 communicating with the terminal 100 through an Internet network 170.

The BSs 110, 120, and 130 include an Access Router (AR), a Mobile Access Gate (MAG), a Local Mobility Anchor (LMA), a Home Agent (HA), and a Foreign Agent (FA), and may perform a routing function and a mobility agent function.

When the terminal 100 is located at a cell managed by the BS 110, 120, or 130, the BSs 110, 120, or 130 allocates an IP address, that is, a Local Home Address (LHoA) to the terminal 100, and the BS 110, 120, or 130 may establish a session with the servers 150 and 160 that communicate with the terminal 100 by using the LHoA allocated to the terminal 100 through the Internet network 170.

For example, when the terminal 100 is located at the cell managed by the first BS 110 in FIG. 1, the first BS 110 may establish a first session 180 with a first server 150 by using LHoA 1-1 allocated to the terminal 100. At this time, the first BS 110 becomes an end of IP communication and transmits data received from the first server 150 to the terminal 100. Then, the first BS 110 becomes the HA. The HA 110 is may track a current position of the terminal 100 in order to guarantee the continuity of the IP session and forward data to a BS managing a cell where the terminal 100 is currently located, and the BS managing the cell where the terminal 100 is currently located is may finally transmit the forwarded data to the terminal 100. At this time, the BS managing the cell where the terminal 100 is currently located becomes the FA.

The home server 140 may perform gateway and mobility agent functions, and allocate an IP address, that is, a Core Home Address (CHoA) to the terminal 100 when the terminal 100 initially accesses the network. The CHoA is not changed with respect to the corresponding terminal even though a position of the terminal 100 is changed and may be used while the terminal 100 is connected to the network. The CHoA is returned to the home server 140 when the terminal 100 is disconnected from the network.

In an embodiment, one CHoA may be allocated to one terminal 100 unlike the LHoA, and the home server 140 may form a session with a server that communicates with the terminal 100 through the Internet network 170 by using the CHoA allocated to the terminal 100. For example, in FIG. 1, the home server 140 may form a second session 190 with the second server 160 by using CHoA 1 allocated to the terminal 100. When the session is formed through the home server 140, the home server 140 becomes an IP end of a packet transmitted to the terminal 100, builds a tunnel, such as a GPRS Tunneling Protocol (GTP) tunnel, with the HA 110 for the IP session continuity, and also builds a GTP tunnel with the third BS 130 that currently manages the terminal 100 in order to transmit data to the terminal 100.

The BSs 110, 120, and 130 configure position tables of the terminal 100 to guarantee the IP session continuity of the sessions established by the terminal 100. The position table is configured in a form of [MSID::allocated HoA::HoA of current terminal], and the BS 110, 120, or 130 receives back the allocated LHoA from the terminal 100 when the connection between the BS 110, 120, or 130 and the terminal 100 is disconnected, such as disconnection of the session anchored by the HA 110. In one embodiment, the home server 140 configures the position table of the terminal 100 in a form of [MSID::allocated HoA], and the terminal configures an HoA table in a form of [HoA::IP address of CN].

When the terminal 100 moves from a cell managed by a current BS to a cell managed by another BS, the terminal 100 may transmit a binding update message including information on the IP address allocated from the BS managing the cell where the terminal 100 is currently located after the movement to the HA 110, and the HA 110 may perform a binding update according to the received binding update message.

For example, when the terminal 100 is currently located at a cell managed by the second BS 120 in FIG. 1, the second BS 120 allocates LHoA 2-1 to the terminal 100 and configures a position table [MSID_1::LHoA 2-1::LHoA 2-1] 135, and the terminal 100 may transmit a binding update message including the allocated LHoA 2-1 to the HA 110. The HA 110 performs a binding update according to the received binding update message, and the position table of the HA 110 is updated from [MSID_1::LHoA 1-1::LHoA 1-1] to [MSID_1::LHoA 1-1::LHoA 2-1] 115. Accordingly, when the HA 110 desires to transmit data to the terminal 100 located at the cell managed by the second BS 120, the HA 110 may build a tunnel with the second BS 120 to transmit data to the second BS 120, and the second BS 120 may finally transmit the received data to the terminal 100.

In one embodiment, when the terminal 100 moves from the second BS 120 to the third BS 130 and the third BS 130 establishes the second session 190 by using CHoA 1 which the home server 140 having allocated to the terminal 100, the third BS 130 is neither the HA nor the IP end since the home server 140 anchors the second session 190. Accordingly, the terminal 100 transmits the binding update message including CHoA 1 to the HA 110, and the HA 110 updates the position table into [MSID_1::LHoA 1-1::CHoA 1] 125. The position tables of the third BS 130 and the home server 140 correspond to [MSID_1::CHoA 1] 145 and 165, and the HoA table of the terminal 100 corresponds to [CHoA:: second server]/[LHoA::first server] 155.

As described above, in the embodiment of the present disclosure, the terminal 100 may generate the session with the servers 150 and 160 communicating with the terminal 100 through the Internet network 170 via the first BS 110 or the home server 140. When the terminal 100 moves to perform a binding update, the HoA included in the binding update may be determined in consideration of time for which the terminal 100 is located at the cell managed by the first BS 110.

That is, when the time for which the terminal 100 has been located at the cell managed by the first BS 110 is equal to or longer than a predetermined threshold, it is determined that the terminal 100 has moved at a slow speed and the terminal 100 may insert the LHoA allocated by the second BS 120 into the binding update message. When the time for which the terminal 100 has been located at the cell managed by the first BS 110 is shorter than the predetermined threshold, the terminal 100 may insert the CHoA allocated by the home server 140 into the binding update message.

Hereinafter the aforementioned contents will be described in detail.

Figure 2:
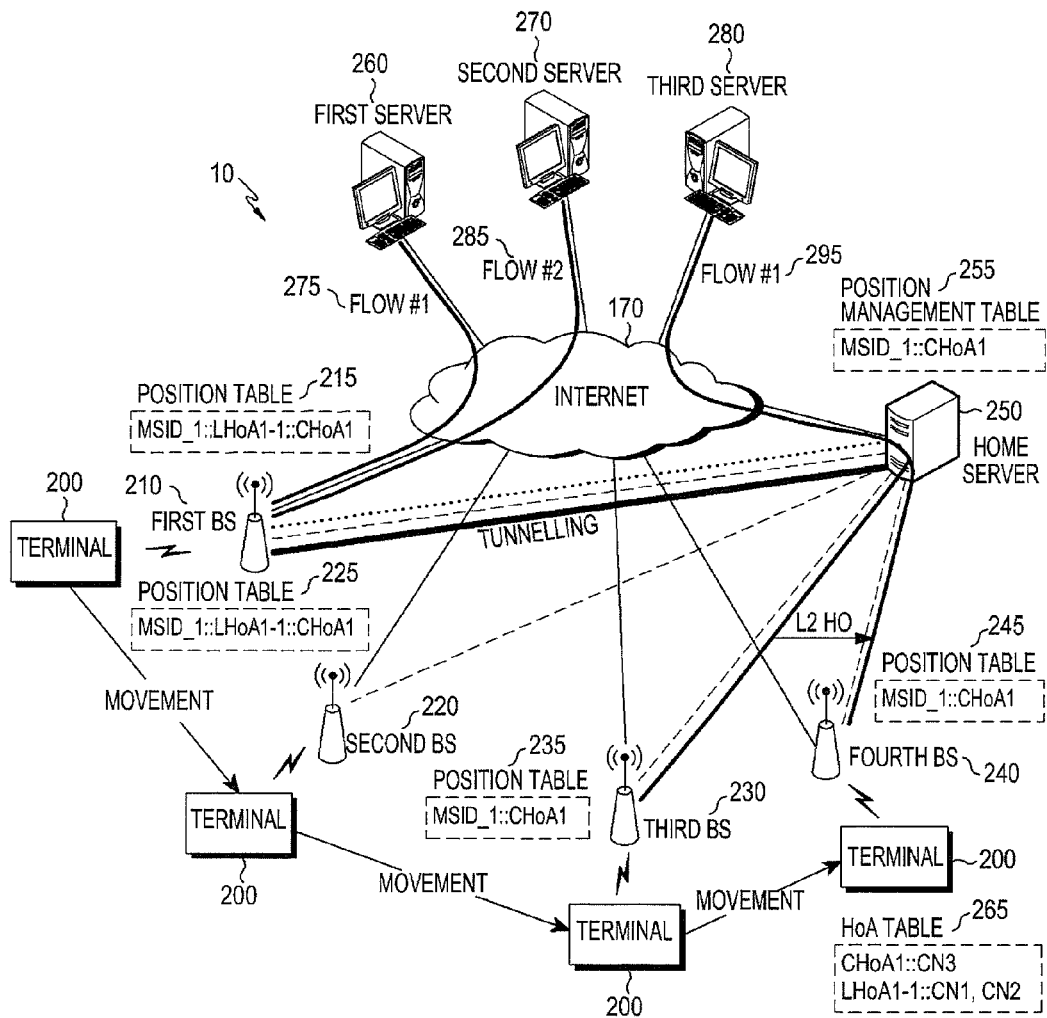
FIG. 2 illustrates an operation of a communication system according to an embodiment of the present disclosure.

FIG. 2 illustrates an operation of the communication system 10 according to an embodiment of the present disclosure.

In FIG. 2, a first BS 210 allocates LHoA 1-1 to a terminal 200, establishes first and second sessions 275 and 285 with first and second servers 260 and 270, and becomes an HA anchoring the first and second sessions 275 and 285. When the terminal 200 moves to the second BS 220 in a state where the time for which the terminal 200 had been located at a cell managed by the first BS 210 is equal to or longer than a predetermined threshold, the second BS 220 allocates LHoA 2-1 to the terminal 200 and the terminal 200 transmits a binding update message including LHoA 2-1 to the first BS 210. The first BS 210 updates a position table by using the received binding update message, builds a tunnel between the first and second BSs 210 and 220 when there is data to be transmitted to the terminal 200, and transmits the data to the terminal 200 through the second BS 220.

When the terminal 200 moves to a third BS 230 in a state where the time for which the terminal 200 had been located at a cell managed by the second BS 220 is shorter than a predetermined threshold, the third BS 230 transmits a binding update message by using CHoA 1 allocated to the terminal 200 by a home server 250 and establishes a session. That is, the terminal 200 transmits the binding update message including CHoA 1 to the first BS 210 and establishes a third session 295 with a third server 230 by using CHoA 1 allocated to the terminal 200 by the home server 250. At this time, the home server 250 becomes the IP end since the home server 250 anchors the third session 295, a tunnel is built between the first BS 210 and the home server 250, and data transmitted through the first and second sessions 275 and 285 is transmitted to the terminal 200 through the home server 250 and the third BS 230.

When the terminal 200 moves to a fourth BS 240 in a state where the time for which the terminal 200 had been located at a cell managed by the third BS 230 is shorter than a predetermined threshold, an IP address of the terminal 200 is not changed and CHoA 1 allocated by the home server 250 is used. The terminal 200 moves from the third BS 230 to the fourth BS 240 through a layer 2 handover, and the home server 250 anchors the third session 295. In one embodiment, since the home server 250 recognizes that the terminal has handed over to the fourth BS 240 through the layer 2 handover, if there is data transmitted to the terminal 200, the data is transmitted to the fourth BS 240. The terminal 200 does not transmit the binding update message to the first BS 210 since the terminal 200 continuously uses CHoA 1. When there is data to be transmitted to the terminal 200, the first BS 210 transmits the data to the home server 250.

In FIG. 2, position tables 215, 245, and 255 and an HoA table 265 indicate an embodiment where the terminal 200 is located at a cell managed by the fourth BS 240 as an example. The HoA of the terminal is currently updated into CHoA 1 in the position table 215 of the first BS 210, and the allocated HoA is configured by CHoA 1 in the position tables 245 and 255 of the fourth BS 240 and the home server 250. In one embodiment, in the HoA table 265 of the terminal 200, HoA is configured by LHoA 1-1 for the first and second sessions 275 and 285 and HoA is configured by CHoA 1 for the third session 295.

When the terminal 200 moves to a fifth BS (not shown) in a state where the time for which the terminal 200 had been located at the cell managed by the fourth BS 240 is equal to or longer than a predetermined threshold, the fifth BS allocates LHoA 5-1 to the terminal 200, and the terminal 200 transmits a binding update message including LHoA 5-1 to the first BS 210. Then, the first BS 210 performs a binding update and then transmits a message to be transmitted to the terminal 200 to the fifth BS. In one embodiment, since the home server 250 recognizes the fifth BS managing the cell where the terminal 200 is currently located through the layer 2 handover, the home server 250 transmits data to be transmitted to the terminal 200 to the fifth BS.

Whether the time for which the terminal 200 has been located at the cell managed by each of the BSs 210, 220, 230, and 240 is equal to or longer than a predetermined threshold may be determined by the terminal 200 or each of the BSs 210, 220, 230, and 240. When the terminal 200 moves to be located at a cell managed by a predetermined BS, the BS that manages the terminal or a cell where the terminal 200 had been located before the movement may inform the predetermined BS of information on whether the time for which the terminal 200 had been located at the cell managed by the BS before the movement is equal to or longer than the predetermined threshold.

The first server 260 and the terminal 200 during a process of transmitting data to the terminal 200 in the state configured as illustrated in FIG. 2 will be described as an example. When the first server 260 transmits data to the terminal 200 through the first session 275 established between the first BS 210 and the first server 260, a data packet is transmitted to the first BS 210 since an address of a receiving side of the data packet is LHoA 1-1, and the first BS 210 identifies a current position of the terminal 200 by using the position table. In FIG. 2, since the address is set as CHoA 1, the first BS 210 transmits the received data packet to the home server 250, and the home server 250 transmits the data packet to the fourth BS 240 and the fourth BS 240 transmits the data packet to the terminal 200.

When the terminal 200 transmits data to the first server 260, the terminal 200 transmits a data packet with a transmitting side address set as LHoA 1-1 and a receiving side address set as the first server 260 to the home server 250. The home server 250 transmits the received data packet to the first BS 210, and the first BS 210 transmits the received data packet to the first server 260.

Figure 3:
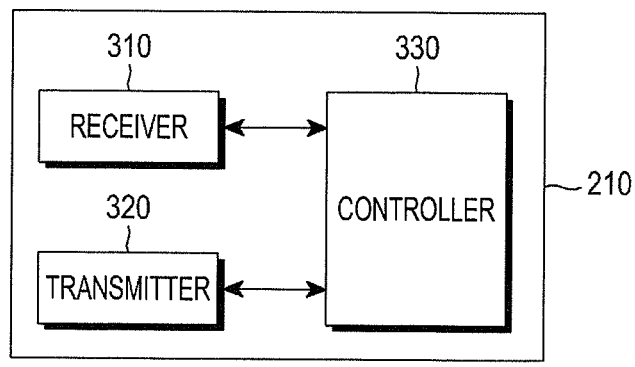
FIG. 3 illustrates a configuration of a first BS according to an embodiment of the present disclosure.

FIG. 3 illustrates a configuration of the first BS 210 according to an embodiment of the present disclosure, and other BSs may include the same configuration.

Referring to FIG. 3, the first BS 210 according to the present disclosure includes a receiver 310, a transmitter 320, and a controller 330. The receiver 310 receives data from the terminal 200 or the home server 250, and the transmitter 320 transmits data to the terminal 200 or the home server 250. In one embodiment, the controller 330 receives information on whether the time for which the terminal 200 had been located at a cell managed by another BS before the terminal 200 has moved to a cell managed by the first BS 210 is equal to or longer than a predetermined threshold and generally controls the first BS 210, such as controlling data transmission/reception of the terminal 200 according to the received information.

Figure 4:
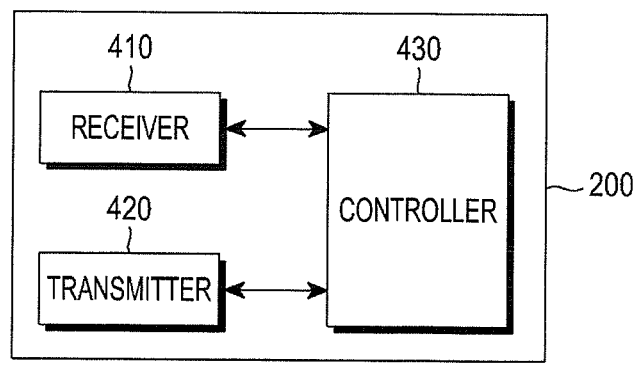
FIG. 4 illustrates a configuration of a terminal according to an embodiment of the present disclosure.

FIG. 4 illustrates a configuration of the terminal 200 according to an embodiment of the present disclosure.

Referring to FIG. 4, the terminal 200 according to the present disclosure includes a receiver 410, a transmitter 420, and a controller 430. The receiver 410 transmits data to each of the BSs and receives data from each of the BSs. The controller 430 determines whether the time for which the terminal 200 has been located at a cell managed by a predetermined BS is equal to or longer than a predetermined threshold. When the terminal 200 moves to a cell managed by another BS, the controller 430 generally controls the terminal 200 according to the present disclosure, such as transmitting one of information on an address allocated to the terminal 200 by the BS after the movement and information on an address allocated to the terminal by the home server 250 to the BS before the movement according to whether the time for which the terminal 200 had been located at the cell managed by the BS before the movement is equal to or longer than the predetermined threshold.

Figure 5:
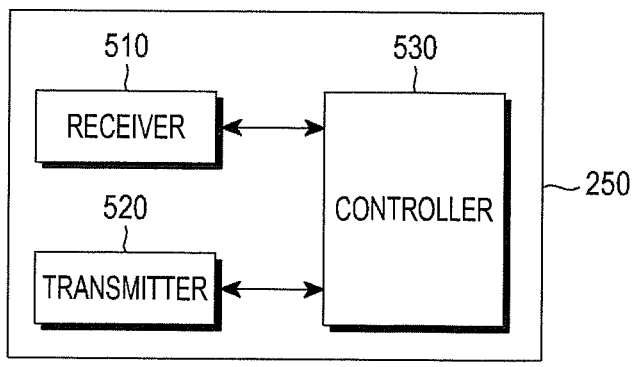
FIG. 5 illustrates a configuration of a home server according to an embodiment of the present disclosure.

FIG. 5 illustrates a configuration of the home server 250 according to an embodiment of the present disclosure.

Referring to FIG. 5, the home server 250 according to the present disclosure includes a receiver 510, a transmitter 520, and a controller 530. The receiver 510 receives data from each of the BSs, and the transmitter 520 transmits data to each of the BSs. The controller 530 receives information on whether the time for which the terminal 200 had been located at a cell managed by another BS before the terminal 200 has moved to a cell managed by a predetermined BS is equal to or longer than a predetermined threshold and generally controls the home server 250 according to the present disclosure, such as controlling data transmission/reception of the terminal 200 by using an address allocated to the terminal according to whether the time is equal to or longer than the threshold.

Figure 6:
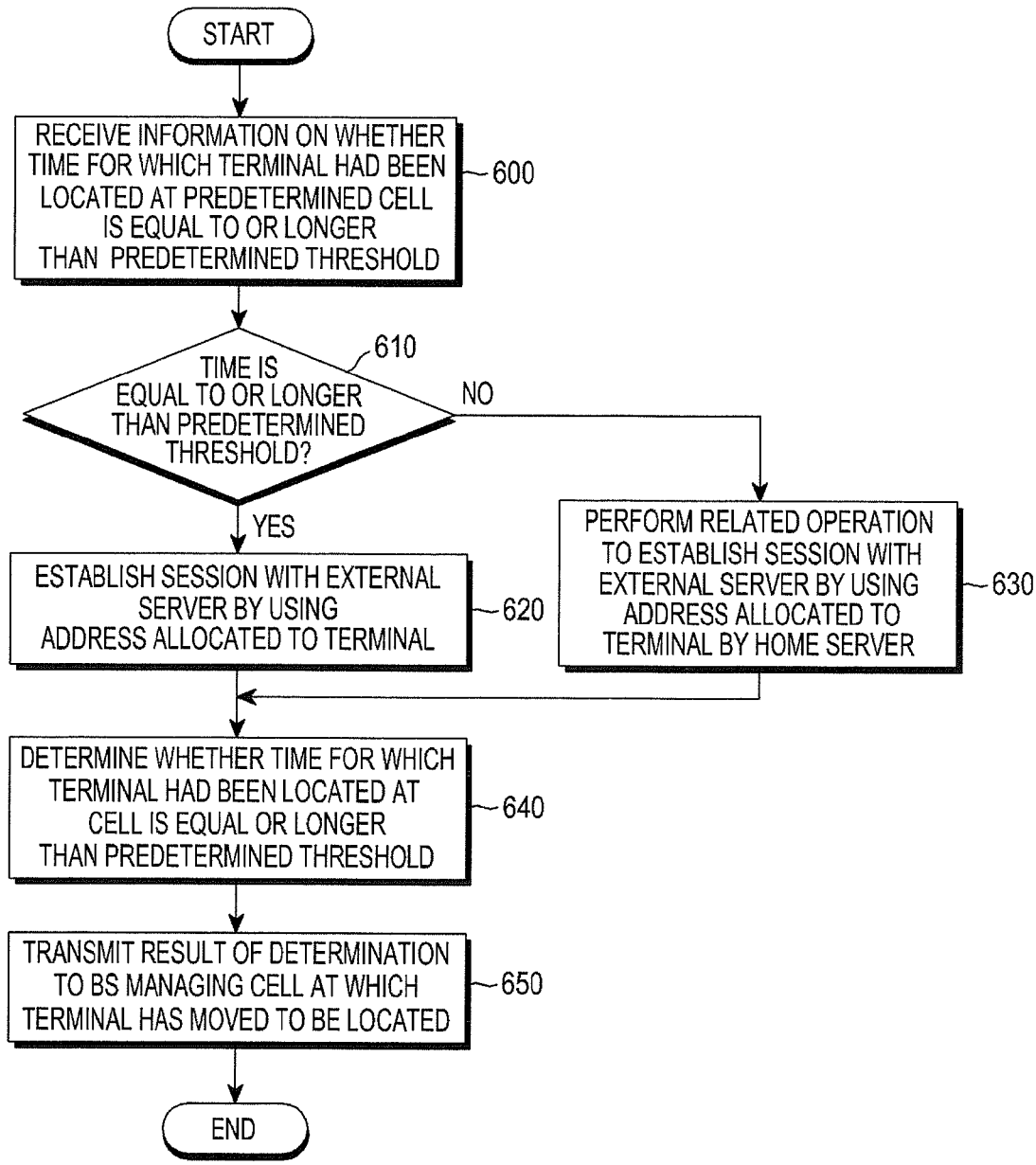
FIG. 6 illustrates a process of an operation of a first BS according to an embodiment of the present disclosure.

FIG. 6 illustrates a process of an operation of the first BS 210 according to an embodiment of the present disclosure, and other BSs may perform the same operation.

Referring to FIG. 6, the first BS 210 receives information on whether the time for which the terminal 200 had been located at a predetermined cell before the terminal 200 has moved to a cell managed by the first BS 210 is equal to or longer than a predetermined threshold (operation 600). When the time is equal to or longer than the predetermined threshold in operation 610—Yes, the first BS 210 establishes a session with an external server communicating with the terminal 200 through the Internet network by using LHoA 1-1 allocated to the terminal 200 by the first BS 210 (operation 620). When the time is shorter than the predetermined threshold in operation 610—No, the first BS 210 performs a related operation to establish a session with an external server by using CHoA 1 allocated to the terminal 200 by the home server 250 (operation 630).

The first BS 210 determines whether the time for which the terminal 200 has been located at the cell managed by the first BS 210 is equal to or longer than the predetermined threshold (operation 640). When the terminal 200 moves to a cell managed by another BS, the first BS 210 transmits the determined information to another BS (operation 650).

Figure 7:
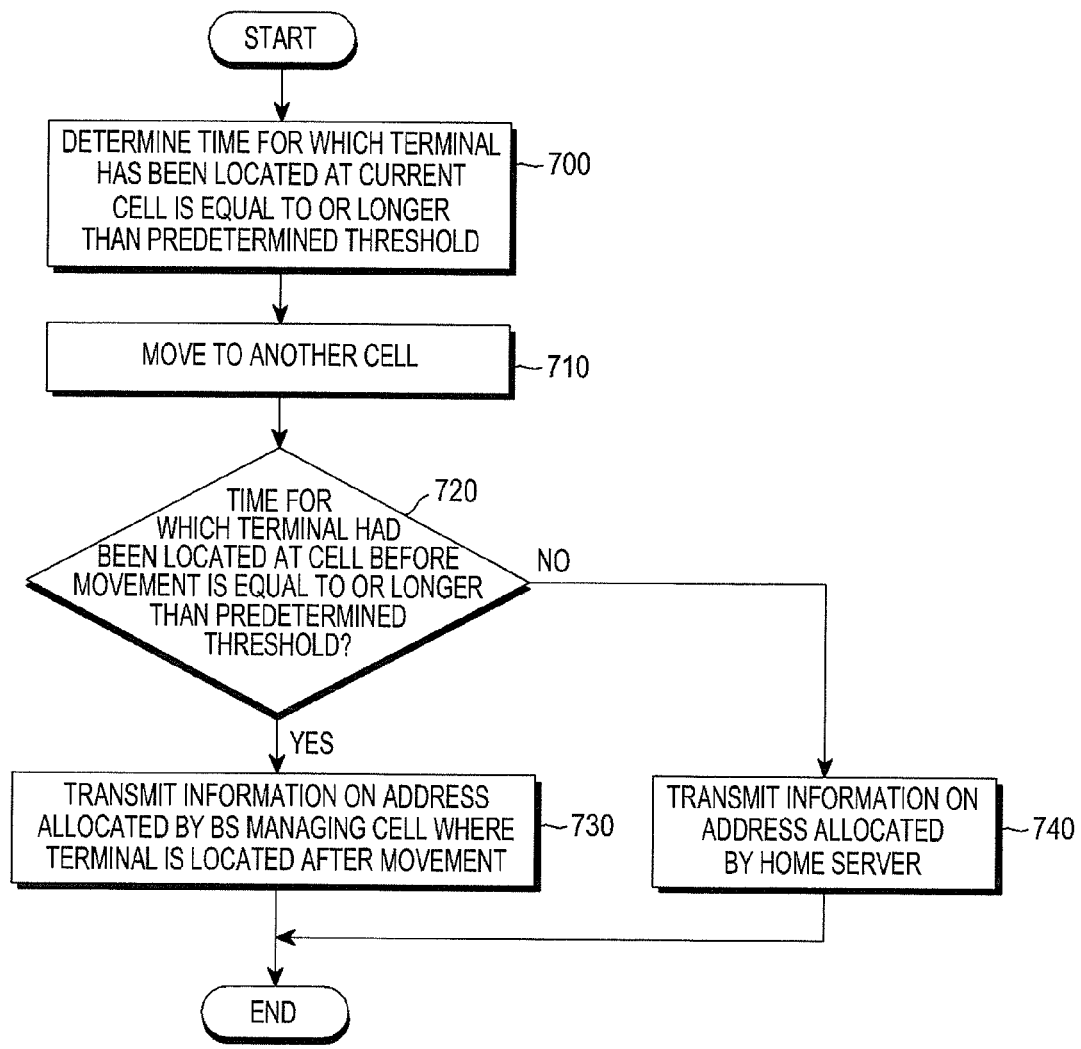
FIG. 7 illustrates a process of an operation of a terminal according to an embodiment of the present disclosure.

FIG. 7 illustrates a process of an operation of the terminal 200 according to an embodiment of the present disclosure.

Referring to FIG. 7, the terminal 200 determines whether the time for which the terminal 200 has been located at a cell where the terminal 200 is currently located is equal to or longer than a predetermined threshold (operation 700). Thereafter, when the terminal 200 moves to another cell in (operation 710) If the time for which the terminal 200 had been located at the cell before the movement is equal to or longer than the predetermined threshold in operation 720—Yes, the terminal 200 transmits information on an address allocated to the terminal 200 by the BS managing the cell after the movement to the BS managing the cell before the movement (operation 730). In contrast, when the time for which the terminal 200 had been located at the cell before the movement is shorter than the predetermined threshold in operation 720—No, the terminal 200 transmits information on an address allocated to the terminal 200 by the home server 250 to the BS managing the cell before the movement (operation 740).

Figure 8:
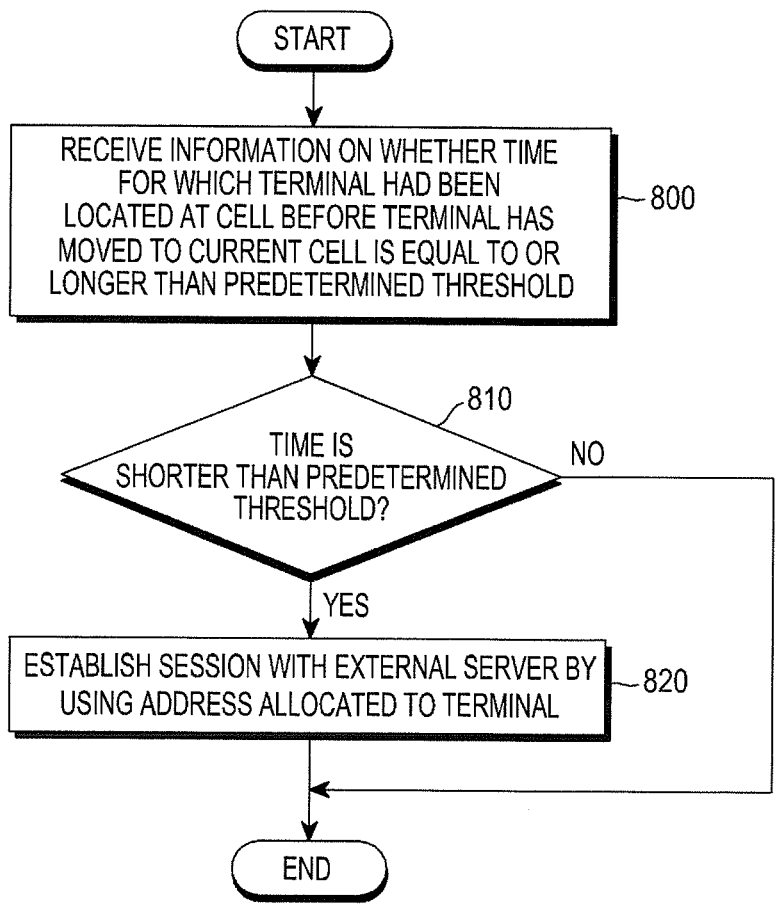
FIG. 8 illustrates a process of an operation of a home sever according to an embodiment of the present disclosure.

FIG. 8 illustrates a process of an operation of the home server 250 according to an embodiment of the present disclosure.

Referring to FIG. 8, the home server 250 receives information on whether the time for which the terminal 200 had been located at a cell before the terminal 200 has moved to a current cell is equal to or longer than a predetermined threshold (operation 800). When the time is shorter than the predetermined threshold in operation 810-Yes, the home server 250 establishes a session with an external server communicating with the terminal 200 through the Internet network by using an address allocated to the terminal 200 by the home server 250 (operation 820).

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of managing mobility of a terminal by a second base station (BS) in a wireless communication network, the method comprising:
    allocating a second local address to a terminal if the terminal moves from a first cell into a second cell of the second BS, wherein a session has been established between the terminal and an external server using a first local address allocated by a first BS;
    receiving information of a dwell time for which the terminal was located in a first cell of the first BS; and
    establishing a session between the terminal and a second external server using the second local address if the dwell time is equal to or longer than a predetermined threshold,
    wherein a local address is valid for time in which the terminal is located in a cell of a BS allocating the local address to the terminal, and a core address is allocated by a home server upon an initial access of the terminal to the network and valid for time in which the terminal is connected to the network regardless of a position of the terminal.

2. The method of claim 1, further comprising:
    establishing a tunnel between the first BS and the second BS;
    receiving data for the terminal through the tunnel, the data being transmitted from the external server to the first server; and
    transmitting the received data to the terminal.

3. The method of claim 1,
    wherein information of the dwell time is transmitted from the first BS or the terminal to the second BS.

4. A method of managing mobility of a terminal in a wireless communication network, the method comprising:
    receiving a first local address from a first base station (BS);
    establishing a session between the terminal and an external server using the first local address;
    receiving a second local address from a second BS if the terminal moves from a first cell of the first BS into a second cell of the second BS; and
    transmitting a binding update message to the first BS;
    wherein the binding update message comprises the second local address allocated by the second BS if a dwell time for which the terminal was located in the first cell is equal to or longer than a predetermined threshold, and the binding update message comprises a core address allocated by a home server if the dwell time is shorter than the predetermined threshold, and
    wherein a local address is valid for time in which the terminal is located in a cell of a BS allocating the local address to the terminal, and the core address is allocated by the home server upon an initial access of the terminal to the network and valid for time in which the terminal is connected to the network regardless of a position of the terminal.

5. The method of claim 4, further comprising:
    if the first BS receives data for the terminal from the external server and a tunnel for transmitting the data is established based on a result of the binding update performed at the first BS, receiving the data through the tunnel.

6. The method of claim 5,
    wherein the tunnel is established between the first BS and the second BS if the dwell time is equal to or longer than the predetermined threshold, and the tunnel is established between the first BS and the home server if the dwell time is shorter than the predetermined threshold.

7. The method of claim 4,
    wherein information of the dwell time is transmitted from the first BS or the terminal to the second BS.

8. A method of managing mobility of a terminal by a home server in a wireless communication network, the method comprising:
    allocating a core address to a terminal upon an initial access of the terminal to the network;
    receiving information of a dwell time for which the terminal was located in a first cell of a first base station (BS), wherein a session has been established between the terminal and a first external server using a first local address allocated by the first BS and the terminal moves from a first cell of the first BS into a second cell of a second BS; and
    establishing a session between the terminal and a second external server using the core address if the dwell time is shorter than a predetermined threshold,
    wherein a local address is valid for time in which the terminal is located in a cell of a BS allocating the local address to the terminal, and the core address is valid for time in which the terminal is connected to the network regardless of a position of the terminal.

9. The method of claim 8, further comprising:
    establishing a tunnel between the first BS and the home server;
    receiving data for the terminal through the tunnel, the data being transmitted from the external server to the first server; and
    transmitting the received data to the terminal.

10. The method of claim 8,
    wherein information of the dwell time is transmitted from the first BS or the terminal to the home server.

11. A second base station (BS) managing mobility of a terminal in a wireless communication network, the second BS comprising:
    a controller configured to allocate a second local address to a terminal if the terminal moves from a first cell into a second cell of the second BS, wherein a session has been established between the terminal and an external server using a first local address allocated by a first BS; and
a transceiver configured to receive information of a dwell time for which the terminal was located in a first cell of the first BS,
wherein the controller further configured to establish a session between the terminal and a second external server using the second local address if the dwell time is equal to or longer than a predetermined threshold,
wherein a local address is valid for time in which the terminal is located in a cell of a BS allocating the local address to the terminal, and a core address is allocated by a home server upon an initial access of the terminal to the network and valid for time in which the terminal is connected to the network regardless of a position of the terminal.

12. The second BS of claim 11,
wherein the controller further configured to establish a tunnel between the first BS and the second BS,
wherein the transceiver further configured to receive data for the terminal through the tunnel, the data being transmitted from the external server to the first server and to transmit the received data to the terminal.

13. The second BS of claim 11,
wherein information of the dwell time is transmitted from the first BS or the terminal to the second BS.

14. A terminal for managing mobility in a wireless communication network, the terminal comprising:
a transceiver configured to receive a first local address from a first base station (BS); and
a controller configured to establish a session between the terminal and an external server using the first local address,
wherein the transceiver configured to receive a second local address from a second BS if the terminal moves from a first cell of the first BS into a second cell of the second BS and transmit a binding update message to the first BS,
wherein the binding update message comprises the second local address allocated by the second BS if a dwell time for which the terminal was located in the first cell is equal to or longer than a predetermined threshold, and the binding update message comprises a core address allocated by a home server if the dwell time is shorter than the predetermined threshold, and
wherein a local address is valid for time in which the terminal is located in a cell of a BS allocating the local address to the terminal, and the core address is allocated by the home server upon an initial access of the terminal to the network and valid for time in which the terminal is connected to the network regardless of a position of the terminal.

15. The terminal of claim 14,
wherein the transceiver configured to, if the first BS receives data for the terminal from the external server and a tunnel for transmitting the data is established based on a result of the binding update performed at the first BS, receive the data through the tunnel.

16. The terminal of claim 15,
wherein the tunnel is established between the first BS and the second BS if the dwell time is equal to or longer than the predetermined threshold, and the tunnel is established between the first BS and the home server if the dwell time is shorter than the predetermined threshold.

17. The terminal of claim 14,
wherein information of the dwell time is transmitted from the first BS or the terminal to the second BS.

18. A home server managing mobility of a terminal in a wireless communication network, the home server comprising:
a controller configured to allocate a core address to a terminal upon an initial access of the terminal to the network; and
a transceiver configured to receive information of a dwell time for which the terminal was located in a first cell of a first base station (BS), wherein a session has been established between the terminal and a first external server using a first local address allocated by the first BS and the terminal moves from a first cell of the first BS into a second cell of a second BS,
wherein the controller further configured to establish a session between the terminal and a second external server using the core address if the dwell time is shorter than a predetermined threshold,
wherein a local address is valid for time in which the terminal is located in a cell of a BS allocating the local address to the terminal, and the core address is valid for time in which the terminal is connected to the network regardless of a position of the terminal.

19. The home server of claim 18,
wherein the controller further configured to establish a tunnel between the first BS and the home server,
wherein the transceiver configured to receive data for the terminal through the tunnel, the data being transmitted from the external server to the first server, and to transmit the received data to the terminal.

20. The home server of claim 18,
wherein information of the dwell time is transmitted from the first BS or the terminal to the home server.

21. A method of managing mobility of a terminal by a first base station (BS) in a wireless communication network, the method comprising:
allocating a first local address to a terminal in a first cell of the first BS;
establishing a session between the terminal and an external server using the first local address;
receiving a binding update message from the terminal if the terminal moves from the first cell into a second cell of a second BS; and
performing a binding update based on the binding update message,
wherein the binding update message comprises a second local address allocated by the second BS if a dwell time for which the terminal was located in the first cell is equal to or longer than a predetermined threshold, and the binding update message comprises a core address allocated by a home server if the dwell time is shorter than the predetermined threshold, and
wherein a local address is valid for time in which the terminal is located in a cell of a BS allocating the local address to the terminal, and the core address is allocated by the home server upon an initial access of the terminal to the network and valid for time in which the terminal is connected to the network regardless of a position of the terminal.

22. The method of claim 21, further comprising:
receiving data for the terminal from the external server;
establishing a tunnel for transmitting the data based on a result of the binding update; and
transmitting the data through the tunnel.

23. The method of claim 22, wherein the establishing a tunnel comprising:
  establishing a tunnel between the first BS and the second BS if the dwell time is equal to or longer than the predetermined threshold; and
  establishing a tunnel between the first BS and the home server if the dwell time is shorter than the predetermined threshold.

24. The method of claim 21,
  wherein information of the dwell time is transmitted from the first BS or the terminal to the second BS.

25. A first base station (BS) managing mobility of a terminal in a wireless communication network, the first BS comprising:
  a controller configured to allocate a first local address to a terminal in a first cell of the first BS, and to establish a session between the terminal and an external server using the first local address; and
  a transceiver configured to receive a binding update message from the terminal if the terminal moves from the first cell into a second cell of a second BS,
  wherein the controller further configured to perform a binding update based on the binding update message,
  wherein the binding update message comprises a second local address allocated by the second BS if a dwell time for which the terminal was located in the first cell is equal to or longer than a predetermined threshold, and the binding update message comprises a core address allocated by a home server if the dwell time is shorter than the predetermined threshold, and
  wherein a local address is valid for time in which the terminal is located in a cell of a BS allocating the local address to the terminal, and the core address is allocated by the home server upon an initial access of the terminal to the network and valid for time in which the terminal is connected to the network regardless of a position of the terminal.

26. The first BS of claim 25,
  wherein the transceiver further configured to receive data for the terminal from the external server,
  wherein the controller configured to establish a tunnel for transmitting the data based on a result of the binding update; and
  wherein the transceiver further configured to transmit the data through the tunnel.

27. The first BS of claim 26, wherein the controller configured to:
  establish a tunnel between the first BS and the second BS if the dwell time is equal to or longer than the predetermined threshold; and
  establish a tunnel between the first BS and the home server if the dwell time is shorter than the predetermined threshold.

28. The first BS of claim 25,
  wherein information of the dwell time is transmitted from the first BS or the terminal to the second BS.

* * * * *